US012518558B2

(12) United States Patent
Saar et al.

(10) Patent No.: US 12,518,558 B2
(45) Date of Patent: Jan. 6, 2026

(54) SUBJECT IDENTIFICATION BASED ON CORRELATED SELF AND/OR FAMILY RELATION CHARACTERISTICS

(71) Applicant: KINSAME TECHNOLOGIES LTD., Magshimim (IL)

(72) Inventors: Tomer Saar, Hod Hasharon (IL); Aviram Bar-Haim, Hod Hasharon (IL); Ayal Brenner, Hod Hasharon (IL)

(73) Assignee: KINSAME TECHNOLOGIES LTD., Magshimim (IL)

( * ) Notice: Subject to any disclaimer, the term of this patent is extended or adjusted under 35 U.S.C. 154(b) by 0 days.

(21) Appl. No.: 18/889,909

(22) Filed: Sep. 19, 2024

(65) Prior Publication Data

US 2025/0140017 A1    May 1, 2025

Related U.S. Application Data

(60) Provisional application No. 63/595,009, filed on Nov. 1, 2023.

(51) Int. Cl.
*G06V 40/12* (2022.01)
*G10L 17/00* (2013.01)

(52) U.S. Cl.
CPC .......... *G06V 40/1365* (2022.01); *G10L 17/00* (2013.01)

(58) Field of Classification Search
CPC ............... G06V 40/1365; G06V 40/70; G06V 40/1347; G06V 10/75; G10L 17/00; G10L 17/06; G10L 25/51; G06F 18/22; G06F 21/32; H04L 63/0861
See application file for complete search history.

(56) References Cited

U.S. PATENT DOCUMENTS

2015/0067822 A1* 3/2015 Randall .................. G06F 21/32
726/17
2018/0211093 A1* 7/2018 Bae ..................... G06V 40/1335

* cited by examiner

*Primary Examiner* — Abhishek Sarma
(74) *Attorney, Agent, or Firm* — Pillsbury Winthrop Shaw Pittman, LLP

(57) ABSTRACT

Identifying subjects based on correlated self and/or family relation (e.g., kinship) characteristics (e.g., fingerprints and/or voice) is described. A previously unseen image or scan or other representation(s) of a fingerprint and/or voice recording of an unknown subject may be used to identify the subject. The previously unseen images of the fingerprint and/or the voice recording may be compared to a database of images of other fingerprints and/or voice recordings. The database of images of other fingerprints and/or voice recordings may include images of other fingerprints and/or other voice recordings of the subject, and/or images of fingerprints and/or voice recordings of family members of the subject. The previously unseen images of the fingerprint and/or the voice recording are correlated with images of other fingerprints and/or voice recordings from the subject, and/or images of fingerprints and/or voice recordings of family members of the subject to identify the subject.

17 Claims, 3 Drawing Sheets

SUBJECT IDENTIFICATION BASED ON CORRELATED SELF AND/OR FAMILY RELATION CHARACTERISTICS

CROSS-REFERENCE TO RELATED APPLICATION

This application claims priority to U.S. Provisional Patent Application No. 63/595,009, entitled SUBJECT IDENTIFICATION BASED ON CORRELATED SELF AND/OR FAMILY RELATION CHARACTERISTICS, filed Nov. 1, 2023, the contents of which are hereby incorporated in their entirety by this reference.

BACKGROUND

1. Field

The present disclosure relates generally to identifying a subject based on the subject's or his kin's (relative's) characteristics/phenotypes (e.g., fingerprints and/or voice).

2. Description of the Related Art

Fingerprint recognition solutions have proven to be extremely useful to security and other organizations in identifying individual subjects. However, if an individual subject's fingerprints are not in an organization's database of fingerprints, the organization may have a difficult time identifying the individual subject. Voice recognition techniques are also widely used. However, they are typically not used for subject identification, and are not used to identify a subject using the voice(s) of his kin.

SUMMARY

The following is a non-exhaustive listing of some aspects of the present techniques. These and other aspects are described in the following disclosure.

Advantageously, the present techniques comprise searching an image or scan or other representation(s) (an 'image'), or multiple images, scans, or representation(s) ("images") of a fingerprint of an unknown subject in a gallery of fingerprints (e.g., images, scans, and/or other representations), and identifying the subject by identifying a strong correlation (a 'match') between the image of the fingerprint and one of the images in the gallery, which may be images of the subject's other fingers and/or a subject's family's fingerprints, even if the subject's fingerprint is not in the image gallery, by exploiting similarity of fingerprints related to both genetic and non-genetic factors (epigenetic or environmental) between different fingers of the subject and/or family members of the subject.

Similarly, the present techniques can be used for searching a voice recording or voice recordings of an unknown subject using a database of voice recordings, and recognizing the subject and/or a subject's family even if the voice recording of the subject is not in the database of voice recordings by exploiting a similarity of voice characteristics between family members.

This may facilitate identification of subjects not currently identifiable, and/or have other applications.

For example, an image (as one example representation) of a fingerprint from an unknown subject may be uploaded to the present system. The system is configured to estimate that the subject belongs to a family, and identify the subject's family members whose fingerprints are part of an existing image gallery of fingerprints (or the subject himself if other fingerprints of the subject are part of the existing image gallery). The subject is identified through his family relationships (or relationships between the fingerprints of his own fingers) because fingerprint features appear similar in images of family members' fingerprints (or images of fingerprints from other fingers of the subject). The reader should envision a similar example for a voice recording from an unknown subject.

This type of identification may facilitate identification of a subject or his family members in emergency situations, identification of the subject after an accident or conflict (e.g., where only a fingerprint of the subject may be available for identification purposes), identification of a subject for an investigation, finding a person of interest, etc.

Is should be noted that even though an "image" or "images" are discussed frequently throughout this text, the principles described herein may be applied using other representations or formats (e.g., scans as one example) showing fingerprints. The same or similar principles apply whether a singular or plural form of an image, scan, or other formats is used. The same is true for many different possible formats for voice recording(s) (e.g., digital, non-digital, etc.).

Some aspects include system(s), method(s), and/or software for identifying subjects based on correlated self and/or family relation (e.g., kinship) characteristics (e.g., images of fingerprint(s), voice recordings, and/or other similarly potentially identifying content). Again, note that images of fingerprints and voice recordings are discussed extensively below, but the concepts described herein may be extended to other potentially identifying content.

In some embodiments, the system(s), method(s), and/or software comprise, facilitate, and/or cause receipt of an image of a fingerprint from an unknown subject. One or more features of the fingerprint of the subject are estimated based on the image. The features are used to estimate that the subject belongs to a family, and identify (1) the subject's family members whose fingerprints are part of an existing image gallery of fingerprints; or (2) the subject himself if other fingerprints of the subject are part of the existing image gallery. The features from the image of the fingerprint of the subject are compared to corresponding features of the images of fingerprints in the image gallery. The subject is identified through his family relationships or relationships between the fingerprints of his own fingers because fingerprint features appear similar in images of family members' fingerprints or images of fingerprints from other fingers of the subject.

In some embodiments, the system(s), method(s), and/or software comprise, facilitate, and/or cause receipt of a voice recording from an unknown subject. One or more features of the voice recording of the subject are estimated. The features are used to estimate that the subject belongs to a family, and identify (1) the subject's family members whose voices are recorded and stored as part of an existing voice recording database; or (2) the subject himself if other voice recordings of the subject are part of the existing voice recording database. The features from the voice recording of the subject are compared to corresponding features of the voice recordings in the database. The subject is identified through his family relationships or relationships between the voice recordings of his own voice because voice features appear similar in recordings of family members' voices or other voice recordings from the subject.

In some embodiments, the system, method, and/or software comprise, facilitate, and/or cause extracting and combining fingerprint or voice recording features for family members of each family in the image gallery of fingerprints or the database of voice recordings; as a preparatory step, randomly selecting a quantity of images of fingerprints or voice recordings of individuals from the image gallery of fingerprints or the voice recording database, temporarily removing an individual from the image gallery of fingerprints or the database of voice recordings as if each individual was unknown, extracting fingerprint or voice features for each individual from the images or the voice recordings, and determining distances from each individual to each family based on the extracted fingerprint or voice features and the combined fingerprint or voice features; sorting, based on the distances, each family for each individual, from a family whose fingerprints or voice most resembles an individual to a family that least resembles the individual; determining probability distributions based on the sorting using a function such that each distance from each individual to each family is associated with a probability, wherein the family with fingerprints or voices that most resembles the individual has a highest probability for the individual and a sum of all family probabilities sums to 1 once the function is applied; determining a sorted ascending arrangement of highest probabilities for each individual; and responsive to receiving the image of the fingerprint or the voice recording of the unknown subject: determining the function of the gallery distances to obtain a highest probability for the unknown subject; placing the highest probability for the unknown subject on the sorted ascending arrangement to estimate a corresponding family associated with the highest probability for the unknown subject and a corresponding confidence; and outputting the corresponding family associated with the highest probability for the unknown subject and the corresponding confidence for display.

In some embodiments, the estimated distances comprise cosine distances, and the cosine distances comprise vectors.

In some embodiments, the sorting of each family distance to each individual generates a typically exponential curve for each individual.

In some embodiments, determining the probability distributions based on the sorting using a function comprises performing the function on the exponential curve of distances for each individual.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
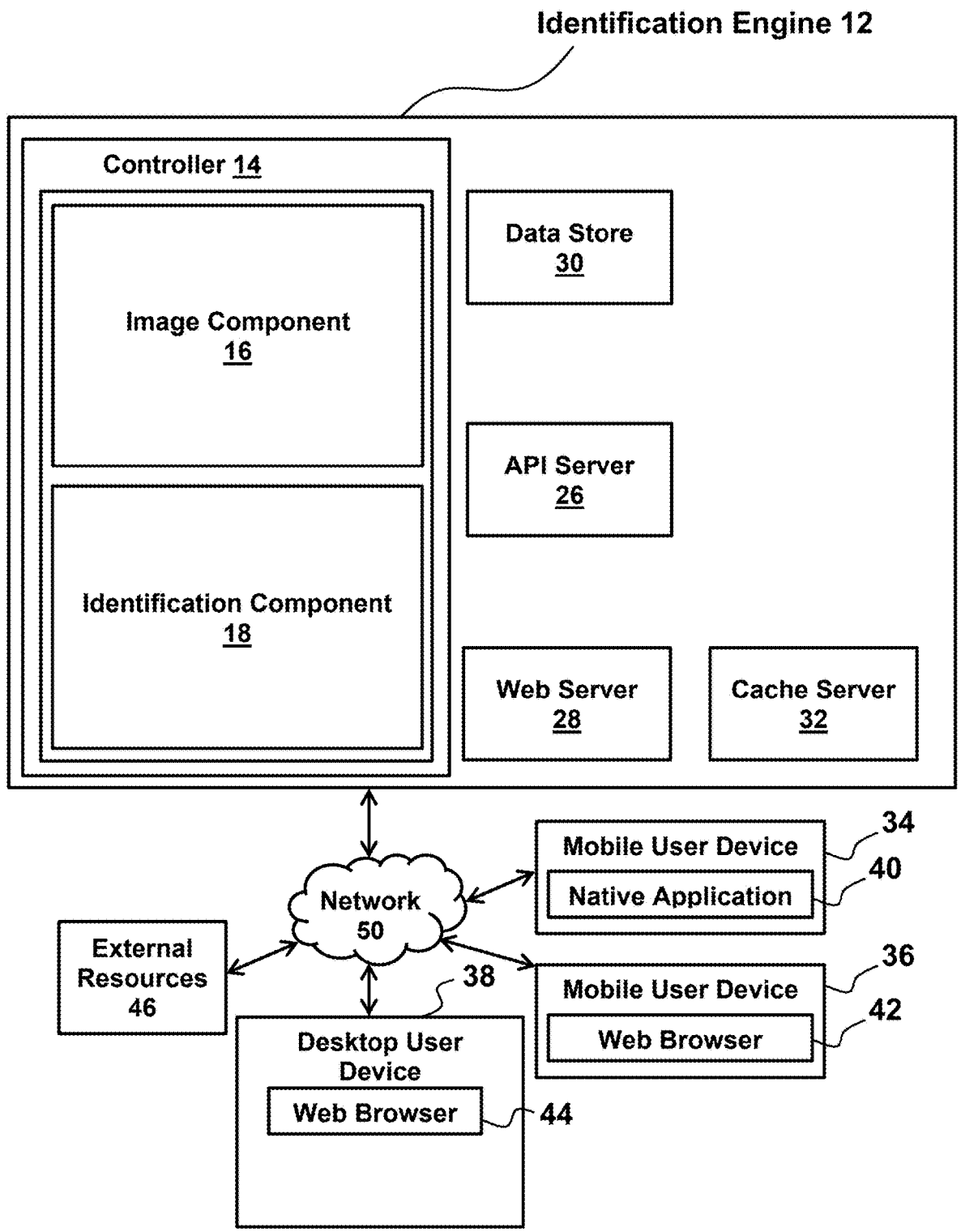
FIG. 1 is a logical-architecture block diagram that illustrates a system including an identification engine and other components as described herein configured for identifying subjects based on correlated self and/or family relation (e.g., kinship) characteristics (e.g., fingerprints and/or voice).

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the field of unknown subject identification and/or others. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

FIG. 1 illustrates a system 10 comprising an identification engine 12 and other components configured to identify subjects based on correlated self and/or family relation (e.g., kinship) characteristics (e.g., fingerprints and/or voice). System 10 is configured to identify a subject even if fingerprints, voice recordings, and/or other characteristic identifiers of the subject are not present in any image gallery, database, etc., by exploiting a similarity of finger print, voice, and/or other features between other parts of the subject himself (e.g., other fingerprints from other fingers) and/or family members. System 10 may also be configured to estimate a confidence that an identification is correct.

These and other benefits are described in greater detail below, after introducing the components of system 10 and describing their operation. It should be noted, however, that not all embodiments necessarily provide all of the benefits outlined herein, and some embodiments may provide all or a subset of these benefits or different benefits, as various engineering and cost tradeoffs are envisioned, which is not to imply that other descriptions are limiting.

In some embodiments, identification engine 12 is executed by one or more of the computers described below with reference to FIG. 2 and may include one or more of a controller 14, an application program interface (API) server 26, a web server 28, a data store 30, and a cache server 32. These components, in some embodiments, communicate with one another in order to provide the functionality of identification engine 12 described herein. As described in greater detail below, in some embodiments, data store 30 may store and/or access data comprising one or more image galleries of finger prints and/or database(s) of voice recordings of subjects, subject's families and/or other data.

Cache server 32 may expedite access to this data by storing likely relevant data in relatively high-speed memory, for example, in random-access memory or a solid-state drive. Web server 28 may serve webpages having graphical user interfaces that display one or more views that facilitate searching an image of a fingerprint and/or voice recording of an unknown subject using the image gallery of fingerprints and/or the database(s) of voice recordings, recognizing the subject and/or the subject's family even if an image of a fingerprint and/or a voice recording of the subject is not imaged in the image gallery or stored in the database(s)

themselves by exploiting a similarity of fingerprint and/or voice features between family members, determining an identification is correct, displaying some and/or all of this or related information, and/or other views. API server 26 may serve data to various applications that process data related to user requested subject identifications, or other data. The operation of these components 26, 28, and 30 may be coordinated by controller 14, which may bidirectionally communicate with each of these components or direct the components to communicate with one another. Communication may occur by transmitting data between separate computing devices (e.g., via transmission control protocol/internet protocol (TCP/IP) communication over a network), by transmitting data between separate applications or processes on one computing device; or by passing values to and from functions, modules, or objects within an application or process, e.g., by reference or by value.

In some embodiments, interaction with users and/or other entities may occur via a website or a native application viewed on a desktop computer, tablet, or a laptop of the user. In some embodiments, such interaction occurs via a mobile website viewed on a smart phone, tablet, or other mobile user device, or via a special-purpose native application executing on a smart phone, tablet, or other mobile user device. Data (e.g., a gallery of images of fingerprints, a database of voice recordings, etc.) may be extracted by controller 14 and/or other components of system 10 from data store 30 and/or other sources inside or outside system 10 in a secure and encrypted fashion. Data extraction by controller 14 may be configured to be sufficient for system 10 to function as described herein, without compromising privacy and/or other requirements associated with a data source. Facilitating secure subject identity determinations across a variety of devices is expected to make it easier for the users to complete identifications when and where convenient for the user, and/or have other advantageous effects.

To illustrate an example of the environment in which identification engine 12 operates, the illustrated embodiment of FIG. 1 includes a number of components with which identification engine 12 communicates: mobile user devices 34 and 36; a desk-top user device 38; and external resources 46. Each of these devices communicates with identification engine 12 via a network 50, such as the Internet or the Internet in combination with various other networks, like local area networks, cellular networks, Wi-Fi networks, or personal area networks.

Mobile user devices 34 and 36 may be smart phones, tablets, gaming devices, or other hand-held networked computing devices having a display, a user input device (e.g., buttons, keys, voice recognition, or a single or multi-touch touchscreen), memory (such as a tangible, machine-readable, non-transitory memory), a network interface, a portable energy source (e.g., a battery), and a processor (a term which, as used herein, includes one or more processors) coupled to each of these components. The memory of mobile user devices 34 and 36 may store instructions that when executed by the associated processor provide an operating system and various applications, including a web browser 42 or a native mobile application 40. The desktop user device 38 may also include a web browser 44. In addition, desktop user device 38 may include a monitor; a keyboard; a mouse; memory; a processor; and a tangible, non-transitory, machine-readable memory storing instructions that when executed by the processor provide an operating system and the web browser and/or the native application 40.

Native application 40 and web browsers 42 and 44, in some embodiments, are operative to provide a graphical user interface associated with a user, for example, which communicates with identification engine 12 and facilitates user interaction with data from identification engine 12. In some embodiments, identification engine 12 may be stored on and/or otherwise be executed user computing resources (e.g., a user computer, server, etc., such as mobile user devices 34 and 36, and desktop user device 38 associated with a user), servers external to the user, and/or in other locations. In some embodiments, identification engine 12 may be run as an application (e.g., an app such as native application 40) on a user server, a user computer, and/or other devices.

Web browsers 42 and 44 may be configured to receive a website from identification engine 12 having data related to instructions (for example, instructions expressed in JavaScript™) that when executed by the browser (which is executed by the processor) cause mobile user device 36 and/or desktop user device 38 to communicate with identification engine 12 and facilitate user interaction with data from identification engine 12. Native application 40 and web browsers 42 and 44, upon rendering a webpage and/or a graphical user interface from identification engine 12, may generally be referred to as client applications of identification engine 12, which in some embodiments may be referred to as a server. Embodiments, however, are not limited to client/server architectures, and identification engine 12, as illustrated, may include a variety of components other than those functioning primarily as a server. Three user devices are shown, but embodiments are expected to interface with substantially more, with more than 100 concurrent sessions and serving more than 1 million users distributed over a relatively large geographic area, such as a state, the entire United States, and/or multiple countries across the world.

External resources 46, in some embodiments, include sources of information such as databases (e.g., which may store one or more image galleries of fingerprints, voice recordings, etc.), websites, etc.; external entities participating with the system 10 (e.g., systems or networks associated with security organizations, etc.), one or more servers outside of the system 10, a network (e.g., the internet), electronic storage, equipment related to Wi-Fi™ technology, equipment related to Bluetooth® technology, data entry devices, or other resources. In some implementations, some or all of the functionality attributed herein to external resources 46 may be provided by resources included in system 10. External resources 46 may be configured to communicate with identification engine 12, mobile user devices 34 and 36, desktop user device 38, and/or other components of the system 10 via wired and/or wireless connections, via a network (e.g., a local area network and/or the internet), via cellular technology, via Wi-Fi technology, and/or via other resources.

Thus, identification engine 12, in some embodiments, operates in the illustrated environment by communicating with a number of different devices and transmitting instructions to various devices to communicate with one another. The number of illustrated external resources 46, desktop user devices 38, and mobile user devices 36 and 34 is selected for explanatory purposes only, and embodiments are not limited to the specific number of any such devices illustrated by FIG. 1, which is not to imply that other descriptions are limiting.

Identification engine 12 may include a number of components that facilitate searching an image of a fingerprint and/or a voice recording, as two examples, of an unknown subject in one or more image galleries of fingerprints and/or database(s) of voice recordings, recognizing the subject and/or the subject's family even if the image of the fingerprint and/or voice recording of the subject is not imaged in any of the image galleries themselves and/or stored in any of the databases. This is performed by exploiting a similarity of fingerprint and/or voice features between other parts of the subject (e.g., images of other fingerprints from other fingers of the subject, or other different voice recordings from the subject) and/or family members, and determining a confidence that a subject recognition is correct. For example, the illustrated API server 26 may be configured to communicate images, image galleries, voice recordings, voice recording databases, and/or other information via a protocol, such as a representational-state-transfer (REST)-based API protocol over hypertext transfer protocol (HTTP) or other protocols. Examples of operations that may be facilitated by the API server 26 include requests to access or retrieve portions or all of one or more image galleries of fingerprints of families, databases of voice recordings, and/or other information. API requests may identify which data is to be displayed (e.g., images, an indication of an estimated family recognition, an indication of a subject identification, a confidence level associated with an identification, etc.), linked, modified, added, or retrieved by specifying criteria for identifying records, such as queries for retrieving or processing information about a particular subject (e.g., an image of a subject's fingerprint and/or a voice recording from the subject described herein), for example. In some embodiments, the API server 26 communicates with the native application 40 of the mobile user device 34 or other components of system 10.

The illustrated web server 28 may be configured to display, link, modify, add, or retrieve portions or all of images of fingerprints and/or voice recordings, an indication of an estimated family recognition, an indication of a subject identification, a confidence level associated with an identification, and/or other information encoded in a webpage (e.g. a collection of resources to be rendered by the browser and associated plug-ins, including execution of scripts, such as JavaScript™, invoked by the webpage). In some embodiments, the graphical user interface presented by the webpage may include inputs by which the user may enter or select data, such as clickable or touchable display regions or display regions for text input. For example, an image of a fingerprint of an unknown subject may be uploaded. Such inputs may prompt the browser to request additional data from the web server 28 or transmit data to the web server 28, and the web server 28 may respond to such requests by obtaining the requested data and returning it to the user device or acting upon the transmitted data (e.g., storing posted data or executing posted commands). In some embodiments, the requests are for a new webpage or for data upon which client-side scripts will base changes in the webpage, such as XMLHttpRequest requests for data in a serialized format, e.g. JavaScript™ object notation (JSON) or extensible markup language (XML). The web server 28 may communicate with web browsers, such as the web browser 42 or 44 executed by user devices 36 or 38. In some embodiments, the webpage is modified by the web server 28 based on the type of user device, e.g., with a mobile webpage having fewer and smaller images and a narrower width being presented to the mobile user device 36, and a larger, more content rich webpage being presented to the desk-top user device 38. An identifier of the type of user device, either mobile or non-mobile, for example, may be encoded in the request for the webpage by the web browser (e.g., as a user agent type in an HTTP header associated with a GET request), and the web server 28 may select the appropriate interface based on this embedded identifier, thereby providing an interface appropriately configured for the specific user device in use.

The illustrated data store 30, in some embodiments, stores and/or is configured to access images of fingerprints, voice recordings, image galleries of family's fingerprints (e.g., if a certain database already facilitates grouping data by various categories including known relatives), voice recordings associated with different families (e.g., again if a certain database already facilitates grouping data by various categories including known relatives), and/or other information. Data store 30 may include various types of data stores, including relational or non-relational databases, image collections, document collections, and/or memory images, for example. Such components may be formed in a single database, or may be stored in separate data structures. In some embodiments, data store 30 comprises electronic storage media that electronically stores information. The electronic storage media of data store 30 may include one or both of system storage that is provided integrally (i.e., substantially non-removable) with system 10 and/or other storage that is connectable (wirelessly or via a wired connection) to system 10 via, for example, a port (e.g., a USB port, a firewire port, etc.), a drive (e.g., a disk drive, etc.), a network (e.g., the Internet, etc.). Data store 30 may be (in whole or in part) a separate component within system 10, or data store 30 may be provided (in whole or in part) integrally with one or more other components of system 10 (e.g., controller 14, external resources 46, etc.). In some embodiments, data store 30 may be located in a data center (e.g., a data center associated with a user), in a server that is part of external resources 46, in a computing device 34, 36, or 38, and/or in other locations. Data store 30 may include one or more of optically readable storage media (e.g., optical disks, etc.), magnetically readable storage media (e.g., magnetic tape, magnetic hard drive, floppy drive, etc.), electrical charge-based storage media (e.g., EPROM, RAM, etc.), solid-state storage media (e.g., flash drive, etc.), or other electronically readable storage media. Data store 30 may store software algorithms, information determined by controller 14, information received via the graphical user interface displayed on computing devices 34, 36, and/or 38, information received from external resources 46, or other information accessed by system 10 to function as described herein.

Controller 14 is configured to coordinate the operation of the other components of identification engine 12 to provide the functionality described herein. Controller 14 may be formed by one or more processors, for example. Controlled components may include one or more of an image component 16, an identification component 18, and/or other components. Controller 14 may be configured to direct the operation of components 16 and/or 18 by software; hardware; firmware; some combination of software, hardware, or firmware; or other mechanisms for configuring processing capabilities.

It should be appreciated that although components 16 and 18 are illustrated in FIG. 1 as being co-located, one or more of components 16 or 18 may be located remotely from the other components. The description of the functionality provided by the different components 16 and/or 18 described below is for illustrative purposes, and is not intended to be limiting, as any of the components 16 and/or 18 may provide more or less functionality than is described, which is not to imply that other descriptions are limiting. For example, one or more of components 16 and/or 18 may be eliminated, and some or all of its functionality may be provided by others of the components 16 and/or 18, again which is not to imply that other descriptions are limiting. As another example, controller 14 may be configured to control one or more additional components that may perform some or all of the functionality attributed below to one of the components 16 and/or 18. In some embodiments, identification engine 12 (e.g., controller 14 in addition to cache server 32, web server 28, and/or API server 26) is executed in a single computing device, or in a plurality of computing devices in a datacenter, e.g., in a service oriented or micro-services architecture.

Image component 16 is configured to receive an image, a scan, and/or other representation (or multiple images, scans, and/or other representations) of a fingerprint from an unknown subject. One or more features of the fingerprint of the subject are estimated based on the image(s), etc. Image component 16 is also configured to perform the same or similar operations for a voice recording (or voice recordings) from an unknown subject, for example (i.e., receipt, feature determination of features), etc.).

For example, various estimated fingerprint features may include absolute and/or relative locations of shapes or patterns of interest, distances between shapes or patterns, lengths of certain fingerprint lines in an image, and/or other information. Estimated features may comprise a shape, size, location, relative location, distance between, etc., of parts of a fingerprint, topographical landmarks of a fingerprint, determinations made based on such data, fingerprint width and/or length, etc. Note that these are just some representative examples of many more and/or different possibilities.

In some embodiments, determining fingerprint features comprises converting the images in the image gallery to numerical data for analysis and/or other operations. The data may be representative of the shape, size, location, relative location, distance between, etc., the parts of a fingerprint, and/or topographical landmarks of the fingerprint, colors of parts of the fingerprint, determinations made based on such data (e.g., whether a fingerprint appears male or female), width, length, breadth, and/or other fingerprint features, information related to three dimensional fingerprint topography data (e.g., linear, surface area, and volumetric data), two dimensional image measurements, fingerprint dimensions, and/or other information. In some embodiments, the numerical data may include points of interest, reference points, linear and surface area topography, volumetric data, etc., from three dimensional images that has been converted to numerical values for mathematical computation and analysis, and/or other numerical data. In some embodiments, the data comprises millions of individual data points.

In some embodiments, an image gallery of fingerprints and/or a database of voice recordings comprises an image of a fingerprint and/or a voice recording of at least one person in each of several families. In some embodiments, the image gallery of fingerprints and/or the database of voice recordings comprises an image of a fingerprint of a different finger (or fingers of the unknown subject) and/or a different voice recording of the unknown subject. In some embodiments, the images and/or voice recordings of at least 10, 100, 1000, or 10000 or more individuals are stored in the image gallery and/or database. In some embodiments, the images of fingerprints and/or the voice recordings of individuals and/or the image gallery and/or voice recording database may be automatically obtained by image component 16 from one or more electronically accessible databases and/or other sources. As described herein, these databases may be provided within and/or outside of system 10 (e.g., by data store 30 and/or external resources 46 shown in FIG. 1). The information may be automatically obtained based on a user request, based on an image upload of a fingerprint and/or voice recording of an unknown subject, and/or based on other prompts.

In some embodiments, the images of fingerprints of individuals may be and/or include two and/or three dimensional images, or sets of images of an individual's fingerprints. The images of fingerprints of individuals may be captured with still cameras, video cameras, may be generated by a model generation system, and/or may be generated by other methods. The images of fingerprints of individuals may include pre-labeled points of interest, reference points, linear and surface area topography, an indication of whether two or more of the images are from members of the same family, and/or other data.

As described above, image component 16 is configured to extract and/or otherwise estimate features of the fingerprints and/or voice recordings for the unknown subject and the individuals whose fingerprints are stored in an image gallery and/or whose voice recordings are stored in a database. There may be similarity of fingerprint and/or voice features between the unknown subject and individuals from the same family in the images and/or voice recordings. There is similarity of fingerprint and/or voice features between the unknown subject and a fingerprint of a different finger (or fingers of the unknown subject) and/or a different voice recording of the unknown subject. This similarity may be used for identification and confidence determination, as described herein. Similarity may comprise relatedness among individuals in a family. Fingerprint and/or voice features may be similar between family members because family members share the same genes, and/or for other reasons. Because the representation of various fingerprint features corresponds to their appearance in an image, if a certain fingerprint feature is similar between family members due to similar genes, a numeric representation of that fingerprint feature will also be similar.

AGGREGATION—In some embodiments, image component 16 is configured to extract and combine fingerprint or voice recording features for family members of each family in the image gallery of fingerprints or the database of voice recordings. An aggregated representation of a family tends to have a general fingerprint feature representation of the family, not just an individual's. The same is true for voice features.

Aggregating may comprise averaging, for example, and/or other aggregating. For example, images of fingerprints from various individuals may be labeled as and/or known to be family members. For some or all of the individuals in a given family, image component 16 may average and/or otherwise aggregate some or all of the fingerprint features such as the shape, size, location, relative location, distance between, etc., of parts of a fingerprint, and/or topographical landmarks of a fingerprint, colors of parts of a fingerprint, determinations made based on such data, a fingerprint volume, width, length, breadth (these are just examples), and/or other fingerprint features. This may produce one aggregated measure for each fingerprint feature, for each family, for example. In some embodiments, the extracted and/or otherwise estimated fingerprint features may be representative of a given individual. In some embodiments, the extracted fingerprint features for each individual in a family may be formed into a single aggregated representation of a family, whether a single number or multiple numbers, i.e. a vector. Such a vector is a collection of numbers representing various fingerprint features, for example. Similar determinations may be made for voice features.

Identification component 18 is configured to use the features, the aggregations of the features, and/or other information to estimate that the subject belongs to a family, and identify (1) the subject's family members whose fingerprints are part of an existing image gallery of fingerprints; or (2) the subject himself if other fingerprints of the subject are part of the existing image gallery. The features from the image of the fingerprint of the subject are compared to corresponding features of the images of fingerprints in the image gallery. The subject is identified through his family relationships or relationships between the fingerprints of his own fingers because fingerprint features appear similar in images of family members' fingerprints or images of fingerprints from other fingers of the subject.

Identification component 18 is also configured to perform the same or similar operations for a voice recording from an unknown subject, for example (i.e., compare features of a voice recording to corresponding features of a database of voice recordings, family determination, subject identification, etc.).

As a preparatory step, controller 14 (between image component 16 and identification component 18) may randomly select a quantity of images of fingerprints or voice recordings of individuals from the image gallery of fingerprints or the voice recording database, and temporarily remove an individual from the image gallery of fingerprints or the database of voice recordings as if each individual was unknown. Controller 14 may extract fingerprint or voice features for each individual from the images or the voice recordings, and estimate distances from each individual to each family based on the extracted fingerprint or voice features and the combined fingerprint or voice features. Controller 14 may sort, based on the distances, each family for each individual, from a family whose fingerprints or voice most resembles an individual to a family that least resembles the individual; and estimate probability distributions based on the sorting using a softmax function (this function is mentioned as one possible example, but may not necessarily be used here) and/or other techniques such that each distance from each individual to each family is associated with a probability. The family with fingerprints or voices that most resembles the individual has a highest probability for the individual and a sum of all family probabilities sums to 1 once the softmax function is applied. Controller 14 may be configured to determine a sorted ascending arrangement of highest probabilities for each individual. Responsive to receiving the image of the fingerprint or the voice recording of the unknown subject, controller 14 may determine the softmax function of the gallery distances to obtain a highest probability for the unknown subject. Controller 14 may place the highest probability for the unknown subject on the sorted ascending arrangement to determine to estimate a corresponding family associated with the highest probability for the unknown subject and a corresponding confidence. Controller 14 may output an indication of the unknown subject and/or the corresponding family associated with the highest probability for the unknown subject, and the corresponding confidence for display, for example.

In some embodiments, the distances comprise cosine distances, and the cosine distances comprise vectors. In some embodiments, the sorting of each family distance to each individual generates a typically exponential curve for each individual. In some embodiments, determining the probability distributions based on the sorting using a softmax function comprises performing a softmax function on the exponential curve of distances for each individual.

In some embodiments, identification component 18 is configured to estimate distances from the individuals (e.g., the selected individuals described above) to the families based on the (aggregated) extracted fingerprint (or voice) features and/or other information. For example, in some embodiments, identification component 18 may be configured to determine a vector associated with a selected individual using and/or based on one or more extracted fingerprint (or voice) features for that individual. Identification component 18 may determine aggregated family vectors for the individual families based on the aggregated extracted fingerprint (or voice) features for each family. A distance from a selected individual to a given family may be a distance between the vector for the individual, and an aggregated family vector.

As another example of one or more of the operations described above, image component 16 may randomly select and extract an image of a single person's fingerprint (or a voice recording) from a dataset (e.g., the image gallery or voice recording database described above) and try to find his family as if he was never in the image gallery or database. This may be repeated 1000's of times, but each time for a single person. Image component 16 is configured to calculate the aggregated feature vector of the families without the extracted individual and perform distance calculations from each individual to each family based on the extracted and aggregated fingerprint (or voice) features for the families, as if each of the 1000's of individuals is unknown. The result is a vector of distances to all families in the dataset. As an example, the distances may be calculated using a cosine distance, but other techniques can be employed. The cosine distance results in values ranging from $-1$ to $1$, where $-1$ denotes exactly opposite, 1 denotes exactly the same person, and 0 denotes orthogonal (meaning no correlation at all). Values in between denote intermediate similarity or dissimilarity.

Identification component 18 may be configured to sort, based on the distances, each family for each individual, from a family whose fingerprints (or voices) most resembles the fingerprint (or voice) of an individual (e.g., where a determined cosine distance is high, approaching one) to a family that least resembles the individual (e.g., with a cosine distance typically around 0). The sorting may be used to generate a curve for each individual. The typical curve is exponential, showing that few of the families resemble the test individual and most families are more distant and reside on the flat side of the curve.

Identification component 18 may be configured to determine probability distributions for the individuals such that distances from the individuals to the families are associated with probabilities. A family whose fingerprints (or voice) most resembles the fingerprint (or voice) of an individual has the highest or maximum probability for that individual. The probability distributions may be determined based on the sorting using a softmax function such that each distance from each individual to each family is associated with a probability, the family whose fingerprints (or voices) most resembles the fingerprints (or voices) of the individual has the highest probability for the individual, and the sum of all family probabilities sums to one once the softmax function is applied. Note that other mathematical operations that normalize the distances and make them comparable between tests may be used.

The softmax function converts a vector of real numbers into a probability distribution. The softmax function may be applied to each curve described above (which represents families sorted based on distances), and generates a corresponding probability distribution such that the sum of all family probabilities sums to one once the softmax function is applied. A family whose fingerprints (or voices) most resembles the fingerprint (or voice) of an individual is associated with the largest fraction (e.g., the highest or max probability) of the summation to one. This facilitates later comparison of distances to other individuals. Since normalization was performed with the softmax function, each distance now has a probability score, where the closest (distance) score gets the highest probability. If there are multiple families close to a test individual, each one gets a lower probability compared to queries where there are less results that are close to the test individual. In that sense, search queries with more ambiguity as for the correct family get penalized with a lower probability on each of the top results.

Identification component 18 is configured to determine a sorted arrangement of the highest or max probabilities of related families for the individuals. The sorted arrangement may be a sorted ascending arrangement, but other sorted arrangements are possible. For example, identification component 18 may be configured to take the highest or max (most similar) probability result for each of the 1000's of different individuals, and graph or otherwise arrange them in a sorted ascending vector of the 1000's of individuals. The graph represents the expected confidence for each absolute (test) individual.

Identification component 18, responsive to receiving an image of a fingerprint (or voice recording) of an unknown subject, is configured to estimate distances from the subject to the families (which as described above, since the image gallery may include images of other fingerprints from the unknown subject, may include determining a distance from the subject to himself). The distances are estimated based on extracted fingerprint (or voice) features from the image of the subject's fingerprint (or voice recording) and the aggregated fingerprint (or voice) features (e.g., as described above), and/or other information. A probability distribution is determined for the subject such that the distances from the subject to the families are associated with a probability. A family that most resembles the subject has the highest probability for the subject. The highest probability for the subject is determined using the softmax function and the distances (e.g., again as described above). For example, image component 18 may be configured to sort, based on the distances, the families for the subject, from a family whose fingerprints (or voices) most resembles the subject to a family that least resembles the subject; and determine the probability distribution for the subject using the softmax function.

Identification component 18 is configured to place the highest probability for a subject on the sorted arrangement to determine the corresponding family associated with the highest probability for the subject and a corresponding confidence. When a user attempts to find relatives of a new test subject, identification component 18 calculates the softmax function of the gallery distances and takes the highest probability. Identification component 18 may place this probability on a graph and determine which corresponding test individual is associated with this probability. If, for example, the probability correlates to a test individual #700 out of 1000, the confidence is 70%.

In some embodiments, identification component 18 is configured to output the corresponding individual and/or family associated with the highest probability for the unknown subject and the corresponding confidence for display (e.g., on one or more of the computing systems and/or user interfaces described above). In some embodiments, a confidence score may be found for each search result and displayed on a user interface (as described herein) to the user.

In some embodiments, one or more components of identification engine 12 may be configured to train an algorithm using input output training image pairs and/or other information that show a subject's fingerprints and/or voice and the fingerprints and/or voices of family members of the subject, and/or other data that describe a subject and the subject's family, for a population of individuals. In some embodiments, controller 14 is configured to cause the algorithm to learn to predict a new subject's (e.g. a subject not included in the input output training image pairs) family based on the input output training pairs. In some embodiments, future predictions of unknown subject's families may be determined based on the trained algorithm.

In some embodiments, the algorithm may comprise one or more individual algorithms. In some embodiments, an algorithm may be a machine learning algorithm. In some embodiments, the machine learning algorithm may be or include a neural network, classification tree, decision tree, support vector machine, or other model that is trained (e.g., with a stochastic gradient descent) and configured to determine the financial capacity of a user. As an example, neural networks may be based on a large collection of neural units (or artificial neurons). Neural networks may loosely mimic the manner in which a biological brain works (e.g., via large clusters of biological neurons connected by axons). Each neural unit of a neural network may be simulated as being connected with many other neural units of the neural network. Such connections can be enforcing or inhibitory in their effect on the activation state of connected neural units. In some embodiments, each individual neural unit may have a summation function which combines the values of all its inputs together. In some embodiments, each connection (or the neural unit itself) may have a threshold function such that the signal must surpass the threshold before it is allowed to propagate to other neural units. These neural network systems may be self-learning and trained, rather than explicitly programmed, and can perform significantly better in certain areas of problem solving, as compared to traditional computer programs. In some embodiments, neural networks may include multiple layers (e.g., where a signal path traverses from front layers to back layers). In some embodiments, back propagation techniques may be utilized by the neural networks, where forward stimulation is used to reset weights on the "front" neural units. In some embodiments, stimulation and inhibition for neural networks may be more free-flowing, with connections interacting in a more chaotic and complex fashion.

Note that different methods for the kinship estimation can be applied, not all include distance measurement or softmax (other architectures can be trained, for example).

It should be noted that in some embodiments, identification engine 12 may be configured such that in the above mentioned operations of the controller 14, input from users and/or sources of information inside or outside system 10 may be processed by controller 14 through a variety of formats, including clicks, touches, uploads, downloads, etc. The illustrated components (e.g., controller 14, API server 26, web server 28, data store 30, and cache server 32) of identification engine 12 are depicted as discrete functional blocks, but embodiments are not limited to systems in which the functionality described herein is organized as illustrated by FIG. 1. The functionality provided by each of the components of identification engine 12 may be provided by software or hardware modules that are differently organized than is presently depicted, for example such software or hardware may be intermingled, broken up, distributed (e.g. within a data center or geographically), or otherwise differently organized. The functionality described herein may be provided by one or more processors of one or more computers executing code stored on a tangible, non-transitory, machine readable medium.

Figure 2:
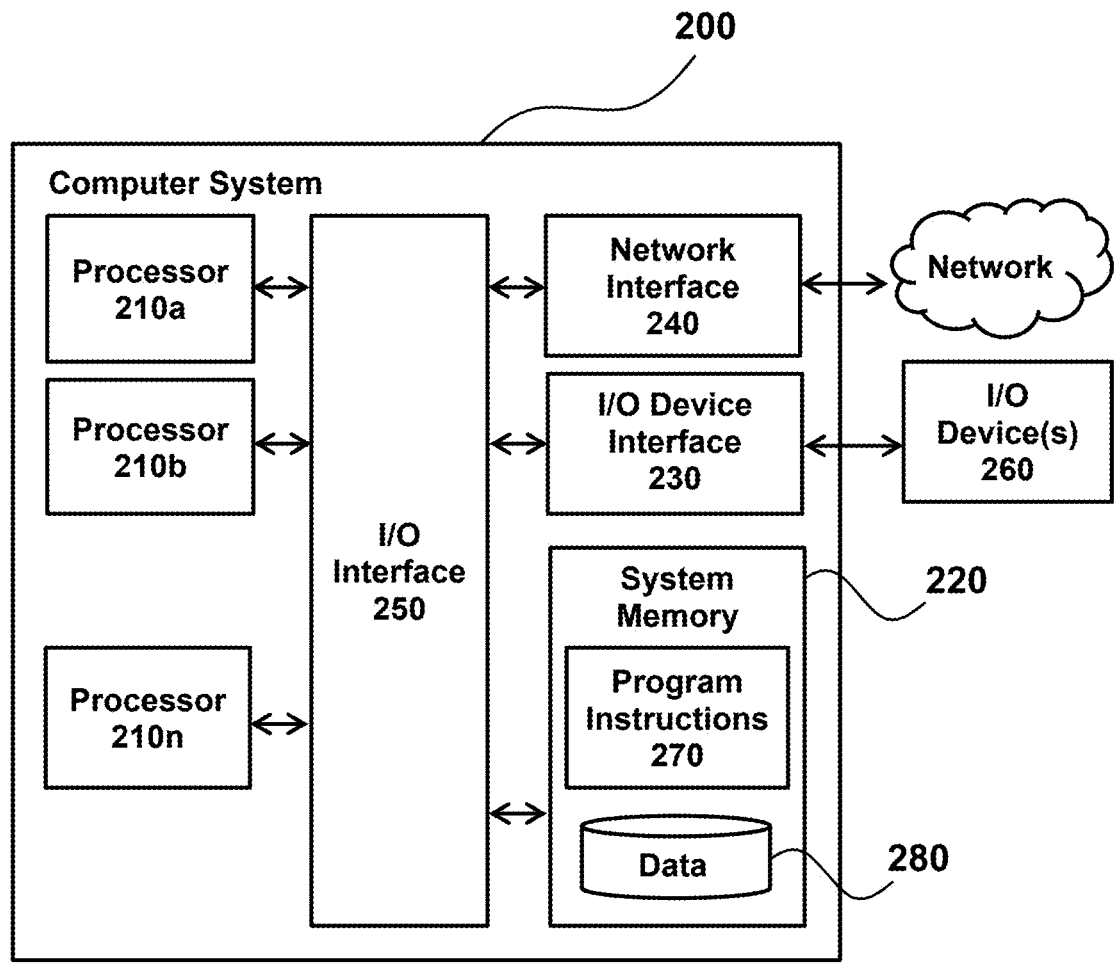
FIG. 2 is a diagram that illustrates an exemplary computing system in accordance with embodiments of the present system.

FIG. 2 is a diagram that illustrates an exemplary computer system 200 in accordance with embodiments of the present system. Various portions of systems and methods described herein may include or be executed on one or more computer systems the same as or similar to computer system 200. For example, identification engine 12, mobile user device 34, mobile user device 36, desktop user device 38, external resources 46 and/or other components of the system 10 (FIG. 1) may be and/or include one more computer systems the same as or similar to computer system 200. Further, processes, modules, processor components, and/or other components of system 10 described herein may be executed by one or more processing systems similar to and/or the same as that of computer system 200.

Computer system 200 may include one or more processors (e.g., processors 210a-210n) coupled to system memory 220, an input/output I/O device interface 230, and a network interface 240 via an input/output (I/O) interface 250. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computer system 200. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 220). Computer system 200 may be a uni-processor system including one processor (e.g., processor 210a), or a multi-processor system including any number of suitable processors (e.g., 210a-210n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computer system 200 may include a plurality of computing devices (e.g., distributed computer systems) to implement various processing functions.

I/O device interface 230 may provide an interface for connection of one or more I/O devices 260 to computer system 200. I/O devices may include devices that receive input (e.g., from a user) or output information (e.g., to a user). I/O devices 260 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 260 may be connected to computer system 200 through a wired or wireless connection. I/O devices 260 may be connected to computer system 200 from a remote location. I/O devices 260 located on a remote computer system, for example, may be connected to computer system 200 via a network and network interface 240.

Network interface 240 may include a network adapter that provides for connection of computer system 200 to a network. Network interface may 240 may facilitate data exchange between computer system 200 and other devices connected to the network. Network interface 240 may support wired or wireless communication. The network may include an electronic communication network, such as the Internet, a local area network (LAN), a wide area network (WAN), a cellular communications network, or the like.

System memory 220 may be configured to store program instructions 270 or data 280. Software such as program instructions 270 may be executable by a processor (e.g., one or more of processors 210a-210n) to implement one or more embodiments of the present techniques. Instructions 270 may include modules and/or components (e.g., components 16 and 18 shown in FIG. 1) of computer program instructions for implementing one or more techniques described herein with regard to various processing modules and/or components. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 220 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 420 may include a non-transitory computer readable storage medium that may have program instructions stored thereon that are executable by a computer processor (e.g., one or more of processors 210a-210n) to cause the subject matter and the functional operations described herein. A memory (e.g., system memory 220) may include a single memory device and/or a plurality of memory devices (e.g., distributed memory devices).

Instructions or other program code to provide the functionality described herein may be stored on a tangible, non-transitory computer readable media. In some cases, the entire set of instructions may be stored concurrently on the media, or in some cases, different parts of the instructions may be stored on the same media at different times, e.g., a copy may be created by writing program code to a first-in-first-out buffer in a network interface, where some of the instructions are pushed out of the buffer before other portions of the instructions are written to the buffer, with all of the instructions residing in memory on the buffer, just not all at the same time.

I/O interface 250 may be configured to coordinate I/O traffic between processors 210a-210n, system memory 220, network interface 240, I/O devices 260, and/or other peripheral devices. I/O interface 250 may perform protocol, timing, or other data transformations to convert data signals from one component (e.g., system memory 220) into a format suitable for use by another component (e.g., processors 210a-210n). I/O interface 250 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 200 or multiple computer systems 200 configured to host different portions or instances of embodiments. Multiple computer systems 200 may provide for parallel or sequential processing/execution of one or more portions of the techniques described herein.

Those skilled in the art will appreciate that computer system 200 is merely illustrative and is not intended to limit the scope of the techniques described herein. Computer system 200 may include any combination of devices or software that may perform or otherwise provide for the performance of the techniques described herein. For example, computer system 200 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, a television or device connected to a television (e.g., Apple TV™), or a Global Positioning System (GPS), or the like. Computer system 200 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 200 may be transmitted to computer system 200 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present invention may be practiced with other computer system configurations.

Figure 3:
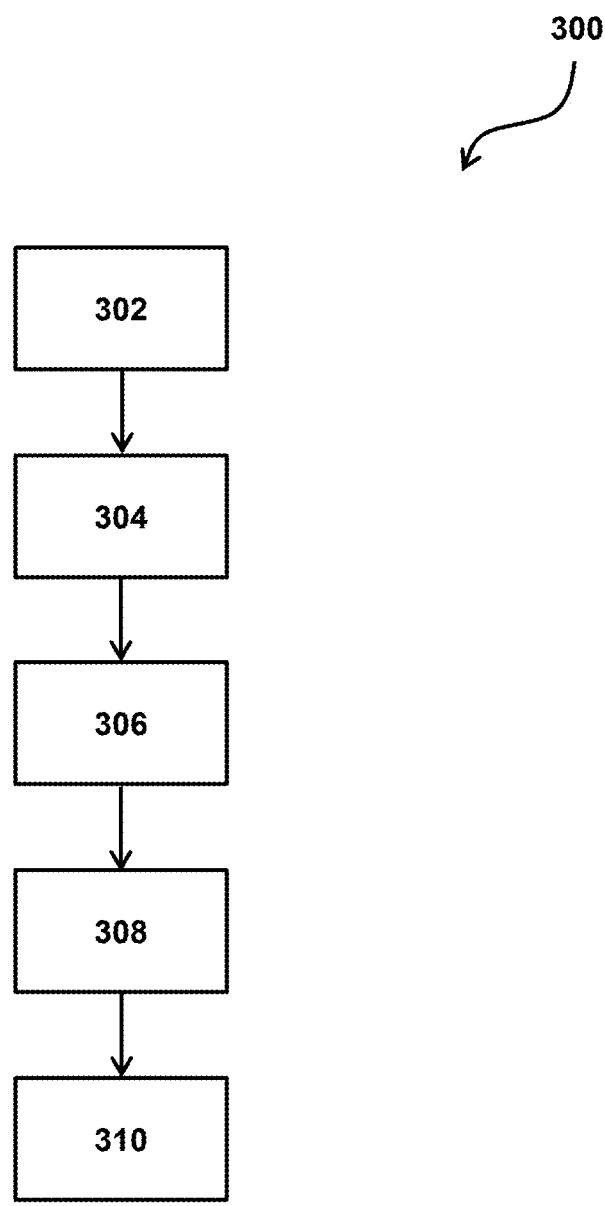
FIG. 3 is a flow chart that illustrates a process for identifying subjects based on correlated self and/or family relation (e.g., kinship) characteristics (e.g., fingerprints and/or voice).

FIG. 3 is a flowchart of a method 300 for identifying subjects based on correlated self and/or family relation (e.g., kinship) characteristics (e.g., fingerprints and/or voice). Method 300 may be performed with some embodiments of system 10 (FIG. 1), computer system 200 (FIG. 2), and/or other components discussed above. Method 300 includes receiving (operation 302) an image of a fingerprint from an unknown subject. One or more features of the fingerprint of the subject are determined (operation 304) based on the image. The features are used to determine (operation 306) that the subject belongs to a family, and identify (1) the subject's family members whose fingerprints are part of an existing image gallery of fingerprints; or (2) the subject himself if other fingerprints of the subject are part of the existing image gallery. The features from the image of the fingerprint of the subject are compared (operation 308) to corresponding features of the images of fingerprints in the image gallery. The subject is identified (operation 310) through his family relationships or relationships between the fingerprints of his own fingers because fingerprint features appear similar in images of family members' fingerprints or images of fingerprints from other fingers of the subject.

Method 300 may include additional operations that are not described, and/or may not include one or more of the operations described below. The operations of method 300 may be performed in any order that facilitates correct (or high confidence) identifications, as described herein.

The reader should envision a similar method for a voice recording from an unknown subject, as described above.

Various embodiments of the present systems and methods are disclosed in the subsequent list of numbered clauses. In the following, further features, characteristics, and exemplary technical solutions of the present disclosure will be described in terms of clauses that may be optionally claimed in any combination.

1. A method for identifying subjects, comprising: receiving at least one representation of a fingerprint from an unknown subject, and/or at least one voice recording from the unknown subject; and identifying the unknown subject based on correlated self and/or family relation kinship characteristics determined based on the at least representation of the fingerprint and/or the at least one voice recording.

2. The method of clause 1, wherein: the at least one representation of the fingerprint comprises a received image or scan of the fingerprint, one or more features of the fingerprint of the unknown subject are estimated based on the image or scan; the features are used to estimate that the unknown subject belongs to a family, based on (1) the unknown subject's family members whose fingerprints are identified in part of an existing image or scan gallery of fingerprints; or (2) the unknown subject himself if other fingerprints of the unknown subject are identified in part of the existing image or scan gallery; the features from the image or scan of the fingerprint of the unknown subject are compared to corresponding features of images of fingerprints in the image or scan gallery; and the unknown subject is identified through his family relationships or relationships between the fingerprints of his own fingers because fingerprint features appear similar in images or scans of family members' fingerprints or images or scans of fingerprints from other fingers of the unknown subject.

3. The method of any of the previous clauses, wherein: a voice recording from the unknown subject is received; one or more features of the voice recording of the unknown subject are estimated; the features are used to estimate that the unknown subject belongs to a family, based on the (1) the unknown subject's family members whose voices are recorded and stored as part of an existing voice recording database being identified; or (2) the unknown subject himself being identified if other voice recordings of the unknown subject are part of the existing voice recording database; the features from the voice recording of the unknown subject are compared to corresponding features of the voice recordings in the database; and the unknown subject is identified through his family relationships or relationships between the voice recordings of his own voice because voice features appear similar in recordings of family members' voices or other voice recordings from the unknown subject.

4. The method of any of the previous clauses, further comprising: extracting and combining fingerprint or voice recording features for family members of each family in an image or scan gallery of fingerprints or a database of voice recordings; as a preparatory step, randomly selecting a quantity of images or scans of fingerprints or voice recordings of individuals from the image or scan gallery of fingerprints or the voice recording database, temporarily removing an individual from the image or scan gallery of fingerprints or the database of voice recordings as if each individual was unknown, extracting fingerprint or voice features for each individual from the images or scans or the voice recordings, and determining distances from each individual to each family based on the extracted fingerprint or voice features and the combined fingerprint or voice features; sorting, based on the distances, each family for each individual, from a family whose fingerprints or voice most resembles an individual to a family that least resembles the individual; determining probability distributions based on the sorting using a function such that each distance from each individual to each family is associated with a probability, wherein the family with fingerprints or voices that most resembles the individual has a highest probability for the individual and a sum of all family probabilities sums to 1 once the function is applied; determining a sorted ascending arrangement of highest probabilities for each individual; and responsive to receiving the image or scan of the fingerprint or the voice recording of the unknown subject: determining the function of the gallery distances to obtain a highest probability for the unknown subject; placing the highest probability for the unknown subject on the sorted ascending arrangement to estimate a corresponding family associated with the highest probability for the unknown subject and a corresponding confidence; and outputting the corresponding family associated with the highest probability for the unknown subject and the corresponding confidence for display.

5. The method of any of the previous clauses, wherein the estimated distances comprise cosine distances, and the cosine distances comprise vectors.

6. The method of any of the previous clauses, wherein the sorting of each family distance to each individual generates a typically exponential curve for each individual.

7. The method of any of the previous clauses, wherein determining the probability distributions based on the sorting using a function comprises performing the function on the exponential curve of distances for each individual.

8. A non-transitory computer readable medium having instructions thereon, the instructions, when executed by a computer, causing the computer to performing operations comprising: receiving at least one representation of a fingerprint from an unknown subject, and/or at least one voice recording from the unknown subject; and identifying the unknown subject based on correlated self and/or family relation kinship characteristics determined based on the at least representation of the fingerprint and/or the at least one voice recording.

9. The medium of clause 8, wherein: the at least one representation of the fingerprint comprises a received image or scan of the fingerprint, one or more features of the fingerprint of the unknown subject are estimated based on the image or scan; the features are used to estimate that the unknown subject belongs to a family, based on (1) the unknown subject's family members whose fingerprints are identified in part of an existing image or scan gallery of fingerprints; or (2) the unknown subject himself if other fingerprints of the unknown subject are identified in part of the existing image or scan gallery; the features from the image or scan of the fingerprint of the unknown subject are compared to corresponding features of images of fingerprints in the image or scan gallery; and the unknown subject is identified through his family relationships or relationships between the fingerprints of his own fingers because fingerprint features appear similar in images or scans of family members' fingerprints or images or scans of fingerprints from other fingers of the unknown subject.

10. The medium of any of the previous clauses, wherein: a voice recording from the unknown subject is received; one or more features of the voice recording of the unknown subject are estimated; the features are used to estimate that the unknown subject belongs to a family, based on the (1) the unknown subject's family members whose voices are recorded and stored as part of an existing voice recording database being identified; or (2) the unknown subject himself being identified if other voice recordings of the unknown subject are part of the existing voice recording database; the features from the voice recording of the unknown subject are compared to corresponding features of the voice recordings in the database; and the unknown subject is identified through his family relationships or relationships between the voice recordings of his own voice because voice features appear similar in recordings of family members' voices or other voice recordings from the unknown subject.

11. The medium of any of the previous clauses further comprising: extracting and combining fingerprint or voice recording features for family members of each family in an image or scan gallery of fingerprints or a database of voice recordings; as a preparatory step, randomly selecting a quantity of images or scans of fingerprints or voice recordings of individuals from the image or scan gallery of fingerprints or the voice recording database, temporarily removing an individual from the image or scan gallery of fingerprints or the database of voice recordings as if each individual was unknown, extracting fingerprint or voice features for each individual from the images or scans or the voice recordings, and determining distances from each individual to each family based on the extracted fingerprint or voice features and the combined fingerprint or voice features; sorting, based on the distances, each family for each individual, from a family whose fingerprints or voice most resembles an individual to a family that least resembles the individual; determining probability distributions based on the sorting using a function such that each distance from each individual to each family is associated with a probability, wherein the family with fingerprints or voices that most resembles the individual has a highest probability for the individual and a sum of all family probabilities sums to 1 once the function is applied; determining a sorted ascending arrangement of highest probabilities for each individual; and responsive to receiving the image or scan of the fingerprint or the voice recording of the unknown subject: determining the function of the gallery distances to obtain a highest probability for the unknown subject; placing the highest probability for the unknown subject on the sorted ascending arrangement to estimate a corresponding family associated with the highest probability for the unknown subject and a corresponding confidence; and outputting the corresponding family associated with the highest probability for the unknown subject and the corresponding confidence for display.

12. The medium of any of the previous clauses, wherein the estimated distances comprise cosine distances, and the cosine distances comprise vectors.

13. The medium of any of the previous clauses, wherein the sorting of each family distance to each individual generates a typically exponential curve for each individual.

14. The medium of any of the previous clauses, wherein determining the probability distributions based on the sorting using a function comprises performing the function on the exponential curve of distances for each individual.

15. A system for identifying subjects, comprising: an interface configured for receiving at least one representation of a fingerprint from an unknown subject, and/or at least one voice recording from the unknown subject; and one or more processors configured for identifying the unknown subject based on correlated self and/or family relation kinship characteristics determined based on the at least representation of the fingerprint and/or the at least one voice recording.

16. The system of clause 15, wherein: the at least one representation of the fingerprint comprises a received image or scan of the fingerprint, one or more features of the fingerprint of the unknown subject are estimated by the one or more processors based on the image or scan; the features are used by the one or more processors to estimate that the unknown subject belongs to a family, based on (1) the unknown subject's family members whose fingerprints are identified in part of an existing image or scan gallery of fingerprints; or (2) the unknown subject himself if other fingerprints of the unknown subject are identified in part of the existing image or scan gallery; the features from the image or scan of the fingerprint of the unknown subject are compared by the one or more processors to corresponding features of images of fingerprints in the image or scan gallery; and the unknown subject is identified by the one or more processors through his family relationships or relationships between the fingerprints of his own fingers because fingerprint features appear similar in images or scans of family members' fingerprints or images or scans of fingerprints from other fingers of the unknown subject.

17. The system of any of the previous clauses, wherein: a voice recording from the unknown subject is received by the interface; one or more features of the voice recording of the unknown subject are estimated by the one or more processors; the features of the voice recording of the unknown subject are used by the one or more processors to estimate that the unknown subject belongs to a family, based on the (1) the unknown subject's family members whose voices are recorded and stored as part of an existing voice recording database being identified; or (2) the unknown subject himself being identified if other voice recordings of the unknown subject are part of the existing voice recording database; the features from the voice recording of the unknown subject are compared by the one or more processors to corresponding features of the voice recordings in the database; and the unknown subject is identified by the one or more processors through his family relationships or relationships between the voice recordings of his own voice because voice features appear similar in recordings of family members' voices or other voice recordings from the unknown subject.

18. The system of any of the previous clauses, wherein: the one or more processors are further configured for extracting and combining fingerprint or voice recording features for family members of each family in an image or scan gallery of fingerprints or a database of voice recordings; as a preparatory step, the one or more processors are configured to randomly select a quantity of images or scans of fingerprints or voice recordings of individuals from the image or scan gallery of fingerprints or the voice recording database, temporarily remove an individual from the image or scan gallery of fingerprints or the database of voice recordings as if each individual was unknown, extract fingerprint or voice features for each individual from the images or scans or the voice recordings, and determine distances from each individual to each family based on the extracted fingerprint or voice features and the combined fingerprint or voice features; the one or more processors are configured to sort, based on the distances, each family for each individual, from a family whose fingerprints or voice most resembles an individual to a family that least resembles the individual; the one or more processors are configured to determine probability distributions based on the sorting using a function such that each distance from each individual to each family is associated with a probability, wherein the family with fingerprints or voices that most resembles the individual has a highest probability for the individual and a sum of all family probabilities sums to 1 once the function is applied; the one or more processors are configured to determine a sorted ascending arrangement of highest probabilities for each individual; and responsive to receiving the image or scan of the fingerprint or the voice recording of the unknown subject, the one or more processors are configured to: determine the function of the gallery distances to obtain a highest probability for the unknown subject; place the highest probability for the unknown subject on the sorted ascending arrangement to estimate a corresponding family associated with the highest probability for the unknown subject and a corresponding confidence; and output the corresponding family associated with the highest probability for the unknown subject and the corresponding confidence for display on a display.

19. The system of any of the previous clauses, wherein the estimated distances comprise cosine distances, and the cosine distances comprise vectors; and/or wherein the sorting of each family distance to each individual generates a typically exponential curve for each individual.

20. The system of any of the previous clauses, wherein determining the probability distributions based on the sorting using a function comprises performing the function on the exponential curve of distances for each individual.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several inventions. Rather than separating those inventions into multiple isolated patent applications, applicants have grouped these inventions into a single document because their related subject matter lends itself to economies in the application process. But the distinct advantages and aspects of such inventions should not be conflated. In some cases, embodiments address all of the deficiencies noted herein, but it should be understood that the inventions are independently useful, and some embodiments address only a subset of such problems or offer other, unmentioned benefits that will be apparent to those of skill in the art reviewing the present disclosure. Due to cost constraints, some inventions disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such inventions or all aspects of such inventions.

It should be understood that the description and the drawings are not intended to limit the invention to the particular form disclosed, but to the contrary, the intention is to cover all modifications, equivalents, and alternatives falling within the spirit and scope of the present invention as defined by the appended claims. Further modifications and alternative embodiments of various aspects of the invention will be apparent to those skilled in the art in view of this description. Accordingly, this description and the drawings are to be construed as illustrative only and are for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

What is claimed is:

1. A method for identifying subjects, comprising:
   receiving at least one representation of a fingerprint from an unknown subject, wherein:

the at least one representation of the fingerprint comprises a received image or scan of the fingerprint, one or more features of the fingerprint of the unknown subject are estimated based on the image or scan;

the features are used to estimate that the unknown subject belongs to a family, based on (1) the unknown subject's family members whose fingerprints are identified in part of an existing image or scan gallery of fingerprints; or (2) the unknown subject himself if other fingerprints of the unknown subject are identified in part of the existing image or scan gallery; and the features from the image or scan of the fingerprint of the unknown subject are compared to corresponding features of images of fingerprints in the image or scan gallery; and identifying the unknown subject based on correlated self and/or family relation kinship characteristics determined based on the at least one representation of the fingerprint, wherein the unknown subject is identified through his family relationships or relationships between the fingerprints of his own fingers because fingerprint features appear similar in images or scans of family members' fingerprints or images or scans of fingerprints from other fingers of the unknown subject.

2. A method for identifying subjects, comprising:

receiving at least one voice recording from the unknown subject, wherein one or more features of the voice recording of the unknown subject are estimated;

the features are used to estimate that the unknown subject belongs to a family, based on the (1) the unknown subject's family members whose voices are recorded and stored as part of an existing voice recording database being identified; or (2) the unknown subject himself being identified if other voice recordings of the unknown subject are part of the existing voice recording database; and the features from the voice recording of the unknown subject are compared to corresponding features of the voice recordings in the database; and identifying the unknown subject based on correlated self and/or family relation kinship characteristics determined based on the at least one voice recording, wherein the unknown subject is identified through his family relationships or relationships between the voice recordings of his own voice because voice features appear similar in recordings of family members' voices or other voice recordings from the unknown subject.

3. A method for identifying subjects, comprising:

extracting and combining fingerprint or voice recording features for family members of each family in an image or scan gallery of fingerprints or a database of voice recordings;

as a preparatory step, randomly selecting a quantity of images or scans of fingerprints or voice recordings of individuals from the image or scan gallery of fingerprints or the voice recording database, temporarily removing an individual from the image or scan gallery of fingerprints or the database of voice recordings as if each individual was unknown, extracting fingerprint or voice features for each individual from the images or scans or the voice recordings, and determining distances from each individual to each family based on the extracted fingerprint or voice features and the combined fingerprint or voice features;

sorting, based on the distances, each family for each individual, from a family whose fingerprints or voice most resembles an individual to a family that least resembles the individual;

determining probability distributions based on the sorting using a function such that each distance from each individual to each family is associated with a probability, wherein the family with fingerprints or voices that most resembles the individual has a highest probability for the individual and a sum of all family probabilities sums to 1 once the function is applied;

determining a sorted ascending arrangement of highest probabilities for each individual;

receiving at least one representation of a fingerprint from an unknown subject, and/or at least one voice recording from the unknown subject; and responsive to receiving the at least one representation in the form of an image or scan of the fingerprint or the at least one voice recording of the unknown subject:

identifying the unknown subject based on correlated self and/or family relation kinship characteristics determined based on the at least one representation of the fingerprint and/or the at least one voice recording;

determining the function of the gallery distances to obtain a highest probability for the unknown subject;

placing the highest probability for the unknown subject on the sorted ascending arrangement to estimate a corresponding family associated with the highest probability for the unknown subject and a corresponding confidence; and outputting the corresponding family associated with the highest probability for the unknown subject and the corresponding confidence for display.

4. The method of claim 3, wherein the estimated distances comprise cosine distances, and the cosine distances comprise vectors.

5. The method of claim 3, wherein the sorting of each family distance to each individual generates a typically exponential curve for each individual.

6. The method of claim 5, wherein determining the probability distributions based on the sorting using a function comprises performing the function on the exponential curve of distances for each individual.

7. A non-transitory computer readable medium having instructions thereon, the instructions, when executed by a computer, causing the computer to perform operations comprising:

receiving at least one representation of a fingerprint from an unknown subject, wherein the at least one representation of the fingerprint comprises a received image or scan of the fingerprint, one or more features of the fingerprint of the unknown subject are estimated based on the image or scan;

the features are used to estimate that the unknown subject belongs to a family, based on (1) the unknown subject's family members whose fingerprints are identified in part of an existing image or scan gallery of fingerprints; or (2) the unknown subject himself if other fingerprints of the unknown subject are identified in part of the existing image or scan gallery; and the features from the image or scan of the fingerprint of the unknown subject are compared to corresponding features of images of fingerprints in the image or scan gallery; and identifying the unknown subject based on correlated self and/or family relation kinship characteristics determined based on the at least one representation of the fingerprint, wherein the unknown subject is identified through his family relationships or relationships between the fingerprints of his own fingers because fingerprint features appear similar in images or scans of family members' fingerprints or images or scans of fingerprints from other fingers of the unknown subject.

8. A non-transitory computer readable medium having instructions thereon, the instructions, when executed by a computer, causing the computer to perform operations comprising:
receiving at least one voice recording from the unknown subject, wherein:
one or more features of the voice recording of the unknown subject are estimated;
the features are used to estimate that the unknown subject belongs to a family, based on the (1) the unknown subject's family members whose voices are recorded and stored as part of an existing voice recording database being identified; or (2) the unknown subject himself being identified if other voice recordings of the unknown subject are part of the existing voice recording database; and
the features from the voice recording of the unknown subject are compared to corresponding features of the voice recordings in the database; and
identifying the unknown subject based on correlated self and/or family relation kinship characteristics determined based on the at least one voice recording, wherein the unknown subject is identified through his family relationships or relationships between the voice recordings of his own voice because voice features appear similar in recordings of family members' voices or other voice recordings from the unknown subject.

9. A non-transitory computer readable medium having instructions thereon, the instructions, when executed by a computer, causing the computer to perform operations comprising:
extracting and combining fingerprint or voice recording features for family members of each family in an image or scan gallery of fingerprints or a database of voice recordings;
as a preparatory step, randomly selecting a quantity of images or scans of fingerprints or voice recordings of individuals from the image or scan gallery of fingerprints or the voice recording database, temporarily removing an individual from the image or scan gallery of fingerprints or the database of voice recordings as if each individual was unknown, extracting fingerprint or voice features for each individual from the images or scans or the voice recordings, and determining distances from each individual to each family based on the extracted fingerprint or voice features and the combined fingerprint or voice features;
sorting, based on the distances, each family for each individual, from a family whose fingerprints or voice most resembles an individual to a family that least resembles the individual;
determining probability distributions based on the sorting using a function such that each distance from each individual to each family is associated with a probability, wherein the family with fingerprints or voices that most resembles the individual has a highest probability for the individual and a sum of all family probabilities sums to 1 once the function is applied;
determining a sorted ascending arrangement of highest probabilities for each individual;
receiving at least one representation of a fingerprint from an unknown subject, and/or at least one voice recording from the unknown subject; and
responsive to receiving the at least one representation in the form of an image or scan of the fingerprint or the at least one voice recording of the unknown subject:
identifying the unknown subject based on correlated self and/or family relation kinship characteristics determined based on the at least one representation of the fingerprint and/or the at least one voice recording;
determining the function of the gallery distances to obtain a highest probability for the unknown subject;
placing the highest probability for the unknown subject on the sorted ascending arrangement to estimate a corresponding family associated with the highest probability for the unknown subject and a corresponding confidence; and
outputting the corresponding family associated with the highest probability for the unknown subject and the corresponding confidence for display.

10. The medium of claim 9, wherein the estimated distances comprise cosine distances, and the cosine distances comprise vectors.

11. The medium of claim 9, wherein the sorting of each family distance to each individual generates a typically exponential curve for each individual.

12. The medium of claim 11, wherein determining the probability distributions based on the sorting using a function comprises performing the function on the exponential curve of distances for each individual.

13. A system for identifying subjects, comprising:
an interface configured for receiving at least one representation of a fingerprint from an unknown subject is received, wherein the at least one representation of the fingerprint comprises a received image or scan of the fingerprint, and
one or more processors configured for identifying the unknown subject based on correlated self and/or family relation kinship characteristics that are determined based on the at least one representation of the fingerprint, wherein,
one or more features of the fingerprint of the unknown subject are estimated by the one or more processors based on the image or scan;
the features are used by the one or more processors to estimate that the unknown subject belongs to a family, based on (1) the unknown subject's family members whose fingerprints are identified in part of an existing image or scan gallery of fingerprints; or (2) the unknown subject himself if other fingerprints of the unknown subject are identified in part of the existing image or scan gallery;
the features from the image or scan of the fingerprint of the unknown subject are compared by the one or more processors to corresponding features of images of fingerprints in the image or scan gallery; and
the unknown subject is identified by the one or more processors through his family relationships or relationships between the fingerprints of his own fingers because fingerprint features appear similar in images or scans of family members' fingerprints or images or scans of fingerprints from other fingers of the unknown subject.

14. A system for identifying subjects, comprising:
an interface configured for receiving at least one voice recording from the unknown subject; and one or more processors configured for identifying the unknown subject based on correlated self and/or family relation kinship characteristics that are determined based on the at least one voice recording, wherein, one or more features of the voice recording of the unknown subject are estimated by the one or more processors;

the features of the voice recording of the unknown subject are used by the one or more processors to estimate that the unknown subject belongs to a family, based on the (1) the unknown subject's family members whose voices are recorded and stored as part of an existing voice recording database being identified; or (2) the unknown subject himself being identified if other voice recordings of the unknown subject are part of the existing voice recording database;

the features from the voice recording of the unknown subject are compared by the one or more processors to corresponding features of the voice recordings in the database; and the unknown subject is identified by the one or more processors through his family relationships or relationships between the voice recordings of his own voice because voice features appear similar in recordings of family members' voices or other voice recordings from the unknown subject.

15. A system for identifying subjects, comprising:

an interface configured for receiving at least one representation of a fingerprint from an unknown subject, and/or at least one voice recording from the unknown subject; and one or more processors configured for identifying the unknown subject based on correlated self and/or family relation kinship characteristics that are determined based on the at least one representation of the fingerprint and/or the at least one voice recording, wherein, the one or more processors are further configured for extracting and combining fingerprint or voice recording features for family members of each family in an image or scan gallery of fingerprints or a database of voice recordings;

as a preparatory step, the one or more processors are configured to randomly select a quantity of images or scans of fingerprints or voice recordings of individuals from the image or scan gallery of fingerprints or the voice recording database, temporarily remove an individual from the image or scan gallery of fingerprints or the database of voice recordings as if each individual was unknown, extract fingerprint or voice features for each individual from the images or scans or the voice recordings, and determine distances from each individual to each family based on the extracted fingerprint or voice features and the combined fingerprint or voice features;

the one or more processors are configured to sort, based on the distances, each family for each individual, from a family whose fingerprints or voice most resembles an individual to a family that least resembles the individual;

the one or more processors are configured to determine probability distributions based on the sorting using a function such that each distance from each individual to each family is associated with a probability, wherein the family with fingerprints or voices that most resembles the individual has a highest probability for the individual and a sum of all family probabilities sums to 1 once the function is applied;

the one or more processors are configured to determine a sorted ascending arrangement of highest probabilities for each individual; and responsive to receiving the at least one representation in the form of an image or scan of the fingerprint or the voice recording of the unknown subject, the one or more processors are configured to:

determine the function of the gallery distances to obtain a highest probability for the unknown subject;

place the highest probability for the unknown subject on the sorted ascending arrangement to estimate a corresponding family associated with the highest probability for the unknown subject and a corresponding confidence; and output the corresponding family associated with the highest probability for the unknown subject and the corresponding confidence for display on a display.

16. The system of claim 15, wherein the estimated distances comprise cosine distances, and the cosine distances comprise vectors; and/or wherein the sorting of each family distance to each individual generates a typically exponential curve for each individual.

17. The system of claim 16, wherein determining the probability distributions based on the sorting using a function comprises performing the function on the exponential curve of distances for each individual.

* * * * *